June 2, 1964 F. SCHACHTER 3,135,231
SPINNER HEAD
Filed July 18, 1961 2 Sheets-Sheet 1
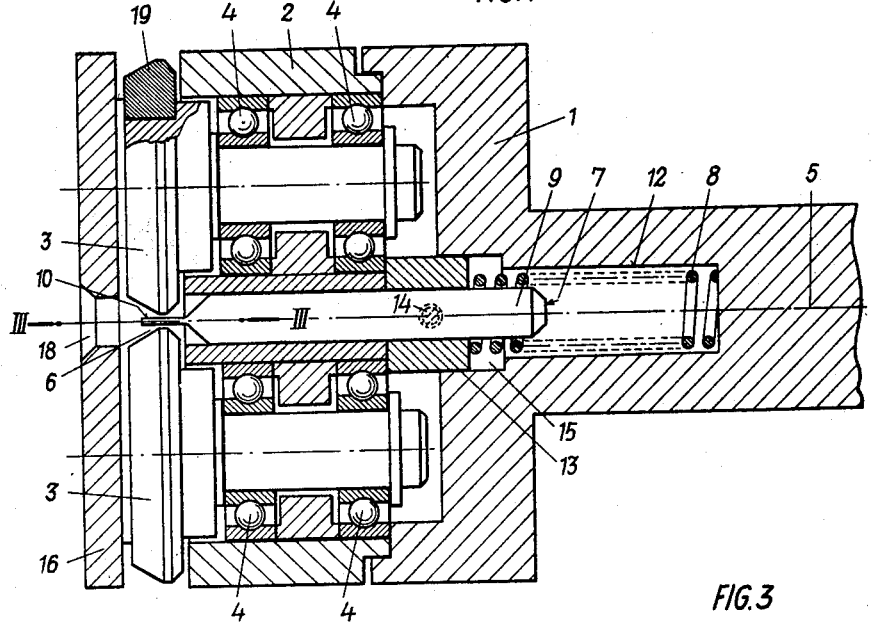
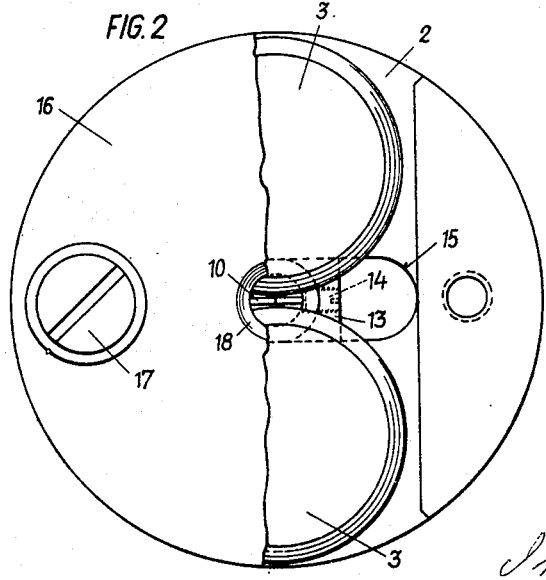
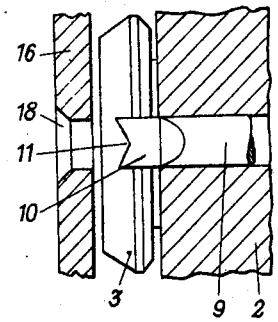
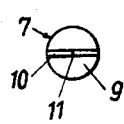
Inventor
Friedrich Schachter June 2, 1964     F. SCHACHTER     3,135,231
SPINNER HEAD
Filed July 18, 1961     2 Sheets-Sheet 2
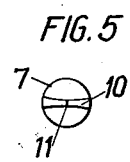
FIG. 5
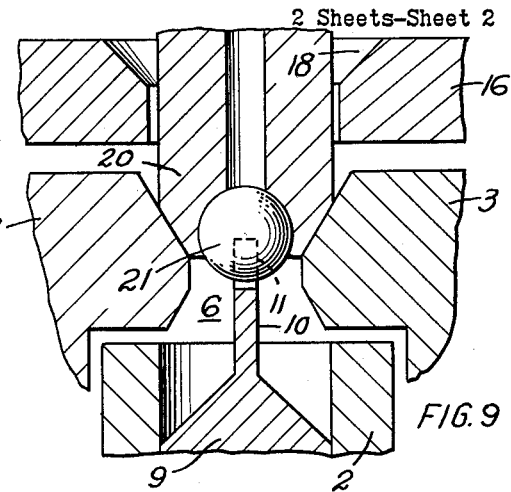
FIG. 9
FIG. 6     FIG. 7
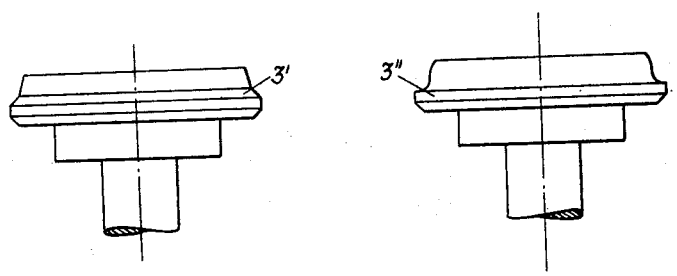
FIG. 8
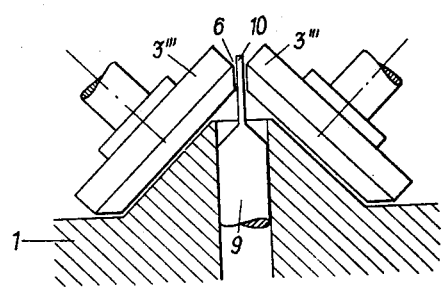
Inventor
Friedrich Schachter
by Munson Khane
atty.

United States Patent Office 3,135,231
Patented June 2, 1964

3,135,231
SPINNER HEAD
Friedrich Schachter, 7333 W. Harrison St.,
Forest Park, Ill.
Filed July 18, 1961, Ser. No. 124,875
Claims priority, application Austria July 22, 1960
5 Claims. (Cl. 113—32)

This invention refers to a tool for manufacture of a lateral curved annular gap between the writing ball of a ball point pen and its socket.

Methods of manufacture of this annular gap are known by which the wall of the socket enclosing the writing ball—after insertion of the writing ball—is formed around and pressed against the ball by a spinning operation, the socket with the inserted writing ball being advanced against the spinning rolls under pressure and relative rotary motion round its axis. The spinning operation has to be stopped as soon as the annular gap resulting from the elongation of the wall enclosing the ball has reached the desired size. A tool used in one of these known methods is provided with three rolls mounted freely rotatable on a common chuck, which is self-aligning with respect to the socket and can rotate round and slide along an axis; said rolls have working surfaces which are inclined to the axis of rotation of the chuck. The axes of the rolls are arranged in the corners of an equilateral triangle and intersect each other at a point of the axis of the chuck. The rolls are the outer rings of small ball bearings. During spinning the writing point is centered between the three rolls. The outside diameter of the ball bearings is defined by the fact that the smallest inscribed circle between the three rolls must be smaller than the smallest outside diameter of the front edge of the socket after spinning. This outside diameter of the ball bearing is in general not more than 4½ times larger than the diameter of the writing ball; ball sizes of 0.6 to 1 mm. therefore require ball bearing diameters of about 2.4 to 4.5 mm.

This known tool therefore has the disadvantage that, as a consequence of the small dimensions of the ball bearings used as spinning rolls, these bearings are quickly worn out by the axial thrust exerted on them. Furthermore, due to variations of the clearance between inner and outer rings of a group of new bearings and to the further increase of clearance caused by wear, the angles between the working surfaces of the rolls and the axis of the socket tend to change in an uncontrollable way, which results in an inadequate control of the size of the annular gap. Due to these deficiencies the known method is not wholly satisfactory for the production of writing points of maximum quality.

In another known tool two conical rolls are used with axes of rotation parallel to each other. One works the front edge of the socket while the other serves as a support tangentially touching the projecting part of the writing ball only. The disadvantage of this tool is first of all the fact, that, as a consequence of the tendency of the writing point to escape from the narrowest space between the two rolls, irregular spinning may occur. Attempts have been made to overcome or reduce these deficiencies by giving one of the rolls the shape of a ring around the other roll, both independently mounted and freely rotatable. Also with this tool, the escape of the writing point from its required position cannot always be avoided, which may again lead to annular gap geometry inadequate for high-quality writing points. Acceptable results can be obtained with the above tools, but the rate of lower-quality or useless writing points is too high. On account of the fact that the quality of the writing points can only be ascertained when the ball pen refills have been filled with ink and assembled with the writing points, a high amount of rejected points considerably increases the costs of manufacture.

It is the objective of the invention to avoid these shortcomings. The tool according to the invention consists of means for centering the socket with the inserted writing ball during the spinning operation in two directions substantially at right angles to each other and both perpendicular to the axis of the socket; in one direction the outer front edge of the socket is centered by the working surfaces of the spinning rolls and in the other direction the ball is centered by a guide blade resilient only in the direction of relative advance of the socket towards the tool, said centering guide solely touching the ball on two opposite points; in this way, the socket with the inserted writing ball is centered preferably in the narrowest portion of the space between the two rolls.

According to the present invention, the apparatus for this method of spinning is characterized by a centering guide which is resilient only in the direction of relative advance of the socket towards the tool head, slidably mounted without radial play in the chuck or tool head, ending in a narrow blade which projects into the space between the two spinning rolls or tools and touches the writing ball only in order to prevent an escape due to the spinning pressure of the writing point from its preferred position between the spinning rolls. With this method and this tool, rolls of sufficiently large diameters with bearings strong enough to withstand the working pressure can be used. While the outer front edge of the socket is centered during spinning in the direction from one roll axis to the other by the working surfaces of the rolls themselves, the socket is indirectly prevented by the described centering of the writing ball by means of the centering guide from escaping from the preferred position between the spinning rolls. This centering guide should come into contact with the writing ball preferably before the spinning operation starts, thus partially centering the writing point; the guide must be movable according to the relative advance of the writing point towards the tool head. This centering can take place in two stages, the writing point being pre-centered by a sufficiently large bore provided in a shield covering the tool head and thereafter centered accurately by the centering guide and the rolls. The centering guide is springloaded and the spring-force has to be sufficient to prevent the writing point from escaping from its preferred position due to the effect of forces generated by the spinning operation. The face of the narrow blade of the centering guide projecting into the space between the two spinning rolls is preferably V-shaped; the angle of the V should be selected so as to ensure that the two centering faces will not touch the front edge of the socket and that they can center the writing ball without excessive spring force being required.

Furthermore, the invention refers to structural details of the tool.

The drawings show the invented tool in several preferred modifications. FIG. 1 shows a longitudinal section of a spinner or tool head; FIG. 2 is a front view of the same with partially exposed rolls; FIG. 3 is a part of a cross-sectional view taken on the line III—III of FIG. 1; FIGS. 4 and 5 are front views of the centering guide in two modifications; FIGS. 6 and 7 are side views of spinning rolls in two different modifications; FIG. 8 is a partial cross-section of a modification of the spinner head; and FIG. 9 is an enlarged, fragmentary sectional detail showing the socket and ball applied to the tool.

In a chuck, tool head or spinner head consisting of two parts 1 and 2 spinning rolls 3 are mounted rotatable in ball bearings 4. The axis 5 of the chuck passes through the center of the space 6 at the narrowest point between the two rolls 3. A centering guide 7 is mounted coaxially with the tool head or chuck and is slidable against the force of a spring 8; the guide member consisting of a shank 9 and a blade 10 projecting into said space 6. The face of the blade is V-shaped as seen in FIG. 3; the line of intersection 11 of the two face planes intersects with the axis 5 and falls substantially into line with the narrowest distance between the two rolls. The spring 8 acts on the one hand against the bottom of a cylindrical hole 12 in the chuck 1 and on the other hand against an adjustable guiding block 13 on the shank 9 of the centering guide 7. This block is fastened by a set screw 14 on the shank 9 of the centering guide member and may slide in a recess 15 in the chuck 1 in the direction of the axis 5. As shown in FIG. 2, the block 13 is prevented from turning by the shape of the recess 15. In this way the centering guide 7 may be adjusted both with respect to its idle position along its axis and to the alignment of the line of intersection 11. The chuck is covered by a shield 16 fastened by screws 17. The shield is provided with a bore 18 concentric to the axis 5 of the chuck for the purpose of pre-centering. The spinning rolls 3 have working surfaces 19 which are made of synthetic sapphire, tungsten carbide etc.; the centering guide 7 can be made of the same materials.

A socket 20 with the inserted writing ball 21 is fed into the spinner head through opening 18 in shield 16 along the axis of rotation 5, whereby it is precentered by the bore 18 and the writing ball brought into contact with the centering guide. Continued feed makes the writing ball slide along one of the inclined faces of the centering guide blade 10 until the ball touches the second face as well. Subsequently, the centering guide is moved backward against the pressure of the spring 8 and the writing point enters the space 6 between the rolls 3. As soon as the front edge of the socket contacts both rolls, the spinning operation starts whereby the lateral curved annular gap around the writing ball is developed.

After retracting the writing point, the centering guide returns to its idle position as shown in FIG. 1.

It is of no importance whether the spinner head 1 rotates and the writing point is moved towards it or whether both movements are performed by the writing point and/or the spinner head.

The diameter of the rolls 3 may be chosen sufficiently large to allow for bearings strong enough to withstand the working pressure. If the working surfaces of the rolls are made of sufficiently hard materials, such as synthetic sapphire, the spinner head needs adjustment or replacement only after very long service.

The pressure of the spinning operation is controlled by a calibrated spring element.

The spring pressure and the number of revolutions of the writing point with respect to the spinner head determine the degree of deformation and the size of the annular gap around the ball.

The comparatively small force of the spring 8 which presses the centering guide against the writing ball during centering causes hardly any wear on the faces of the centering guide. In any case, wear of said faces is permissible as long as these faces do not touch the front edge of the socket. The cross-section of the guide blade 10 may be rectangular, as shown in FIGS. 2 and 4, or it may follow the curve of the rolls, as shown in FIG. 5.

The working surfaces of the spinning rolls 3 may be formed of two zones having different inclinations towards the axes of the rolls. Such a roll is shown in FIG. 6. The generatrix of these working surfaces need not be straight, as shown in FIG. 7. In FIGS. 1 to 3 the spinning rolls are mounted parallel to each other and to the axis of rotation 5 of the chuck. The working surfaces of these rolls must therefore be substantially cone-shaped. As an alternative, the axes of the rolls may be inclined to each other and to the axis of rotation of the spinner head or chuck, as shown in FIG. 8. The working surfaces of these rolls may, but need not be cylindrical.

The above disclosures and descriptions are purely illustrative and are not intended to be in any sense limiting.

I claim:

1. In a ball pen spinning device, the combination of a chuck having an axis, a pair of pen socket spinning rolls rotatably mounted in juxtaposed relation on said chuck at diametrically opposite sides of said axis and having their axes of rotation disposed in a common diametric plane of the chuck, the peripheries of said rolls being spaced apart, a spring-pressed centering guide slidably mounted axially in said chuck, and a flat blade provided at one end of said guide and disposed in the space between the peripheries of said rolls in a plane at right angles to said common diametric plane of the chuck, the thickness of said blade being smaller than the space between the peripheries of said rolls whereby the blade is spaced from the peripheries of both rolls, said blade having a contoured outer edge adapted for centering a pen ball on the axis of said chuck.

2. The device as defined in claim 1 wherein said contoured outer edge of said blade is V-shaped to provide a pair of convergent edge portions having their point of convergence on the axis of said chuck.

3. The device as defined in claim 1 wherein the axes of rotation of said spinning rolls are mutually convergent.

4. The device as defined in claim 1 wherein said blade and said spinning rolls are provided with work engaging surfaces formed from wear-resistant material.

5. The device as defined in claim 1 together with a shield mounted on said chuck exteriorly of said spinning rolls, said shield being provided with a pen socket guiding and pre-centering aperture coaxial with the axis of said chuck.

References Cited in the file of this patent

UNITED STATES PATENTS

| | | |
|---|---|---|
| 2,718,051 | Cloutier | Sept. 20, 1955 |
| 2,818,828 | Schachter | Jan. 7, 1958 |
| 2,879,586 | Fehling et al. | Mar. 31, 1959 |
| 2,953,047 | Stillwagon | Sept. 20, 1960 |
| 2,970,558 | Albertini | Feb. 7, 1961 |
| 2,976,610 | Schuck | Mar. 28, 1961 |
| 2,992,572 | Lockart | July 18, 1961 |
| 3,067,709 | Conti et al. | Dec. 11, 1962 |

FOREIGN PATENTS

| | | |
|---|---|---|
| 224,537 | Australia | Oct. 13, 1959 |